US009057554B2

(12) United States Patent
Quinlan et al.

(10) Patent No.: US 9,057,554 B2
(45) Date of Patent: Jun. 16, 2015

(54) SERVICE AND MAINTENANCE GUIDE FOR APPLIANCE

(75) Inventors: Daniel H. Quinlan, Stevensville, MI (US); Michael A. Kahwaji, Los Angeles, CA (US); Ananth Uggirala, Mountain View, CA (US); Sang W. Lee, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 1450 days.

(21) Appl. No.: 11/957,717

(22) Filed: Dec. 17, 2007

(65) Prior Publication Data
US 2008/0159494 A1 Jul. 3, 2008

Related U.S. Application Data

(60) Provisional application No. 60/882,269, filed on Dec. 28, 2006.

(51) Int. Cl.
*F25B 49/00* (2006.01)
*F25D 29/00* (2006.01)
*G05B 19/042* (2006.01)
*F25D 11/02* (2006.01)
*F25D 23/12* (2006.01)

(52) U.S. Cl.
CPC .... *F25D 29/008* (2013.01); *G05B 2219/24084* (2013.01); *F25C 2400/10* (2013.01); *F25D 11/02* (2013.01); *F25D 23/126* (2013.01); *F25D 2400/06* (2013.01); *F25D 2400/361* (2013.01); *G05B 19/0428* (2013.01); *G05B 2219/24086* (2013.01); *G05B 2219/2654* (2013.01)

(58) Field of Classification Search
CPC ............... F25D 24/006; F25D 24/008; F25D 2400/361; F25D 29/006; F25D 29/008; G05B 14/028; G05B 2219/2654; G05B 2219/24084; G05B 19/0428
USPC ............... 62/125, 127, 129; 236/94; 165/11.1
See application file for complete search history.

(56) References Cited

U.S. PATENT DOCUMENTS

| | | | |
|---|---|---|---|
| 5,596,878 A * | 1/1997 | Hanson et al. | 62/160 |
| 5,987,105 A | 11/1999 | Jenkins et al. | |
| 6,453,687 B2 | 9/2002 | Sharood et al. | |
| 6,715,302 B2 * | 4/2004 | Ferragut, II | 62/129 |
| 6,873,255 B2 | 3/2005 | Gallagher | |
| 6,883,930 B2 | 4/2005 | Saban et al. | |
| 7,225,054 B2 * | 5/2007 | Amundson et al. | 700/276 |
| 2001/0034609 A1 * | 10/2001 | Dovolis | 705/1 |

(Continued)

OTHER PUBLICATIONS

JP 2006031285 (English Abstract).*

(Continued)

*Primary Examiner* — Jonathan Bradford

(57) ABSTRACT

A household appliance such as a refrigerator includes a housing and a user interface operatively connected to the housing. The user interface includes a display and user inputs. The user interface is adapted for showing on the display a part number for a component part, contact information for use in acquiring the component part, and instructions for installing the component part. The contact information may include a phone number. The contact information may include a web site address. The component part may be a replacement part such as a filter or the component part may be an accessory part. The user interface may also be adapted for displaying instructions or service or maintenance tasks.

31 Claims, 7 Drawing Sheets

(56) References Cited

U.S. PATENT DOCUMENTS

| | | | |
|---|---|---|---|
| 2001/0052896 A1* | 12/2001 | Yun | 345/173 |
| 2002/0101346 A1* | 8/2002 | Busick | 340/521 |
| 2004/0186596 A1* | 9/2004 | Roh et al. | 700/19 |
| 2005/0103875 A1* | 5/2005 | Ashworth et al. | 236/94 |
| 2005/0268624 A1* | 12/2005 | Voglewede et al. | 62/126 |
| 2006/0144646 A1* | 7/2006 | Engel et al. | 187/391 |
| 2006/0272341 A1* | 12/2006 | Shin et al. | 62/126 |

OTHER PUBLICATIONS

"User." Dictionary.com. Dictionary.com, n.d. Web. Oct. 28, 2013.*

* cited by examiner

SERVICE AND MAINTENANCE GUIDE FOR APPLIANCE

CROSS-REFERENCE TO RELATED APPLICATION

This application claims the benefit of U.S. provisional application Ser. No. 60/882,269, filed Dec. 28, 2006, which is incorporated herein in its entirety.

BACKGROUND OF THE INVENTION

Field of the Invention

The present invention relates generally to appliances, and will generally be discussed with respect to refrigerators, although the present invention is not necessarily limited to refrigerators but may include other types of appliances or household appliances.

One of the problems with household appliances or kitchen appliances such as refrigerators relates to the difficulties in service and maintenance. For example, refrigerators with ice makers and/or water dispensers typically have water filters to assist in purifying water. These water filters require periodic replacement. To assist in maintaining the refrigerator, some refrigerators provide feedback to users in various forms to indicate that it is time to replace the water filters. Yet, despite this advance, problems remain. In particular, users may need to consult appropriate instruction manuals or user guides to determine where the water filter is and how to replace it. In addition, the user may need to consult the appropriate instruction manuals or user guides in order to determine the correct part number for a replacement water filter. The user may also need to consult the appropriate instruction manuals or user guides to determine how one obtains a replacement water filter. In some cases, a user may have lost or misplaced his instruction manual or user guide.

Similar problems exist with other routine service or maintenance activities, such as adjusting a shelf or changing a light bulb. The user often does not have ready access to an instruction manual or user guide.

What is needed is an improved appliance for addressing these problems.

SUMMARY OF THE INVENTION

Therefore, it is a primary object, feature, or advantage of the present invention to improve upon the state of the art.

It is a further object, feature, or advantage of the present to provide an appliance which reduces problems associated with service and maintenance.

It is a still further object, feature, or advantage of the present invention to provide an appliance which provides contact information for obtaining replacement parts for the appliance.

Another object, feature, or advantage of the present invention is to provide an appliance which provides part numbers associated with replacement parts and/or accessories.

Yet another object, feature, or advantage of the present invention is to provide an appliance which provides installation instructions for replacement parts and/or accessories.

A further object, feature, or advantage of the present invention is to provide an appliance which provides instructions for service and maintenance tasks.

A further object, feature, or advantage of the present invention is to provide an appliance which reduces a user's need for reliance on user's manuals to service and maintain the appliance.

One or more of these and/or other objects, features, or advantages of the present invention will become apparent from the specification and claims that follow.

According to one aspect of the present invention, a refrigerator is provided. The refrigerator includes a refrigerator cabinet for enclosing at least one refrigerating compartment, a display operatively connected to the cabinet, and a control unit electrically connected to the display. The control unit is adapted for determining the presence of a condition requiring a replacement part. The control unit is adapted for displaying on the display a visual indicator indicative of the presence of the condition requiring the replacement part. The control unit is adapted for receiving from the user an input requesting additional information about the condition requiring the replacement part. The control unit is also adapted for displaying additional information about the condition requiring the replacement part on the display after receiving the input requesting additional information from the user. The additional information about the condition may include contact information for ordering a part. The contact information may include a phone number or a web site address. The additional information about the condition may include a part number for a replacement part. The replacement part may be a filter such as a water filter. The additional information may include instructions for servicing the refrigerator such as instructions for installing the replacement part. The visual indicator may indicate the presence of the condition requiring the replacement part by blinking or otherwise alerting the user.

According to another aspect of the present invention, a household appliance is provided. The household appliance includes a household appliance housing and a user interface operatively connected to the housing. The user interface includes a display and user inputs. The user interface is adapted for showing on the display a part number for a component part, contact information for use in acquiring the component part, and instructions for installing the component part. The contact information may include a phone number. The contact information may include a web site address. The component part may be a replacement part, such as a filter, or the component part may be an accessory part. The appliance may be a refrigerator and the household appliance housing may be a refrigerator cabinet.

According to another aspect of the present invention, a method for providing convenience to a user of a refrigerator such that the user may service the refrigerator without consulting written documentation is provided. The method includes providing the refrigerator wherein the refrigerator includes a housing and a user interface operatively connected to the housing. The user interface includes a display. The method further includes displaying on the display of the user interface of the refrigerator a part number for a component part and contact information for use in acquiring the component part. The component part may be a replacement part, such as a water filter, or an accessory part. The method may further include displaying on the display of the user interface instructions for replacing a component part. The contact information may include a phone number or a web site address. The method may further include receiving an order for the component part from the user.

According to another aspect of the present invention, a system for use in a household appliance is provided. The system includes a display, at least one user input associated with the display and a memory storing screen display information including part numbers for component parts, contact information for use in acquiring the component parts, and instructions for installing the component parts. The display is adapted for showing on the display at least one of the part numbers, the contact information, and the instructions. The component parts may be refrigerator parts. The component parts may include replacement parts or accessory parts.

According to another aspect of the invention, a household appliance is provided, the appliance includes a housing, a user interface operatively connected to the housing and having a display and user inputs. The user interface is adapted for showing on the display instructions for service or maintenance tasks. The instructions may take the form of text, still images, video and combinations of such items with accompanying audio.

DETAILED DESCRIPTION OF PREFERRED EMBODIMENTS

Figure 1:
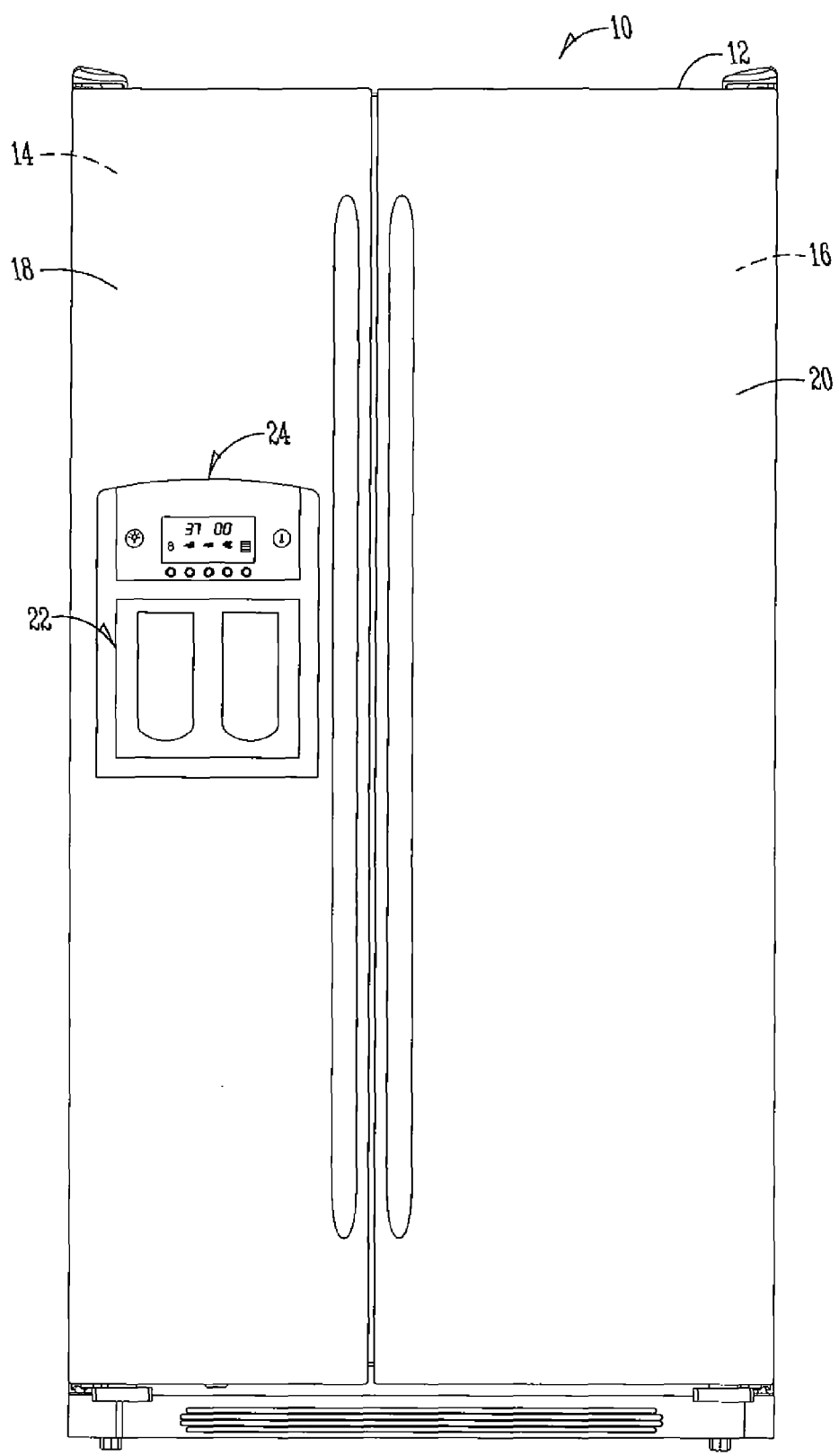
FIG. 1 is a perspective view of a refrigerator according to one embodiment of the present invention.

FIG. 1 is a perspective view illustrating one embodiment of an appliance. The appliance shown in FIG. 1 is a refrigerator 10. The refrigerator 10 has a refrigerator cabinet 12 which serves as an appliance housing and encloses refrigerating compartments, including a freezer compartment 14 and a refrigerator compartment 16. A freezer compartment door 18 is provided as well as refrigerator compartment door 20 for providing access to the respective compartments. An ice dispenser unit 22 is shown on the freezer compartment door. Above the ice dispenser unit 22 is a user interface 24. The user interface 24 need not be in the location shown, may be incorporated into the ice dispenser 22, or may be otherwise positioned. The refrigerator 10 shown in FIG. 1 is merely one embodiment of a refrigerator. The refrigerator may be configured differently and need not have multiple compartments or the side-by-side configuration shown.

Figure 2A:
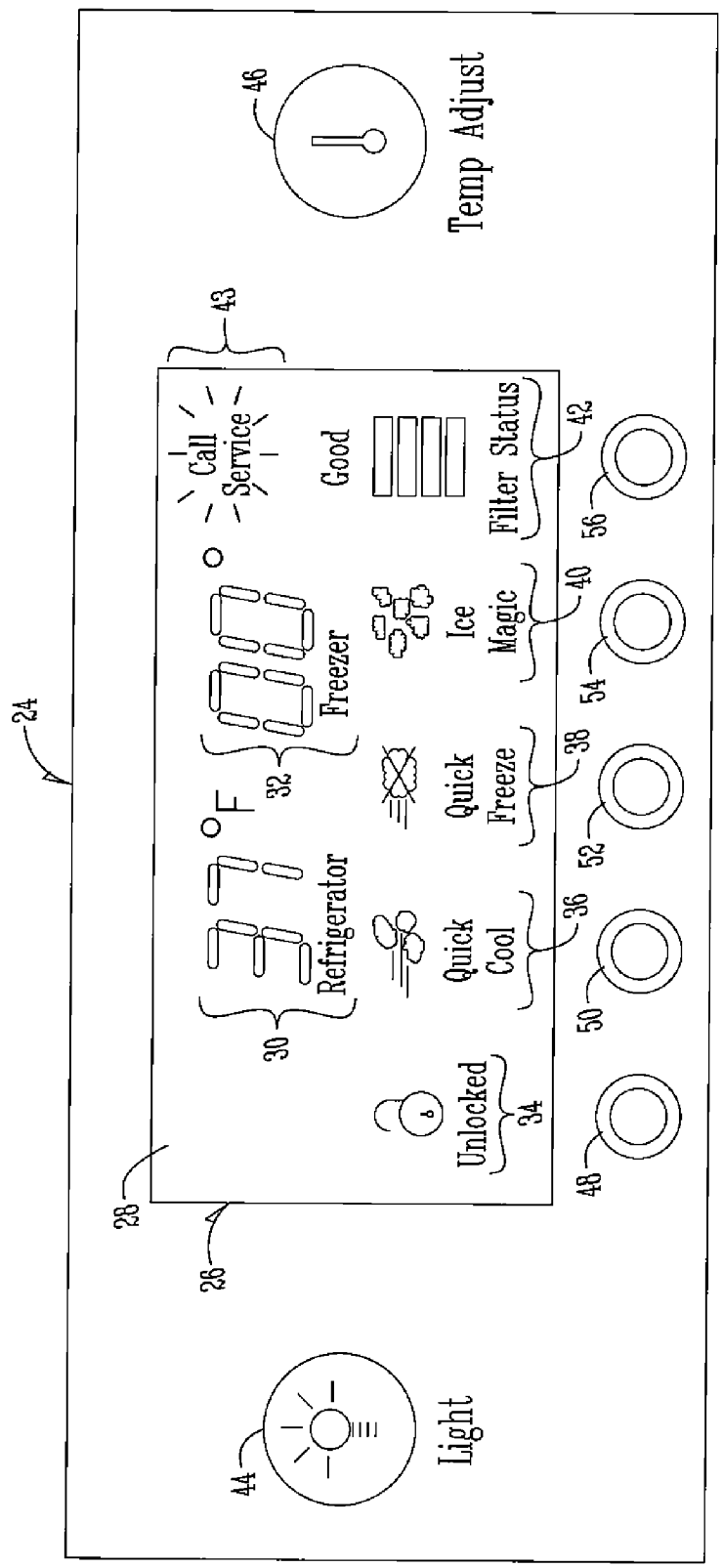
FIG. 2A is display of a user interface associated with a refrigerator according to one embodiment of the present invention with a call service icon flashing.
Figure 2B:
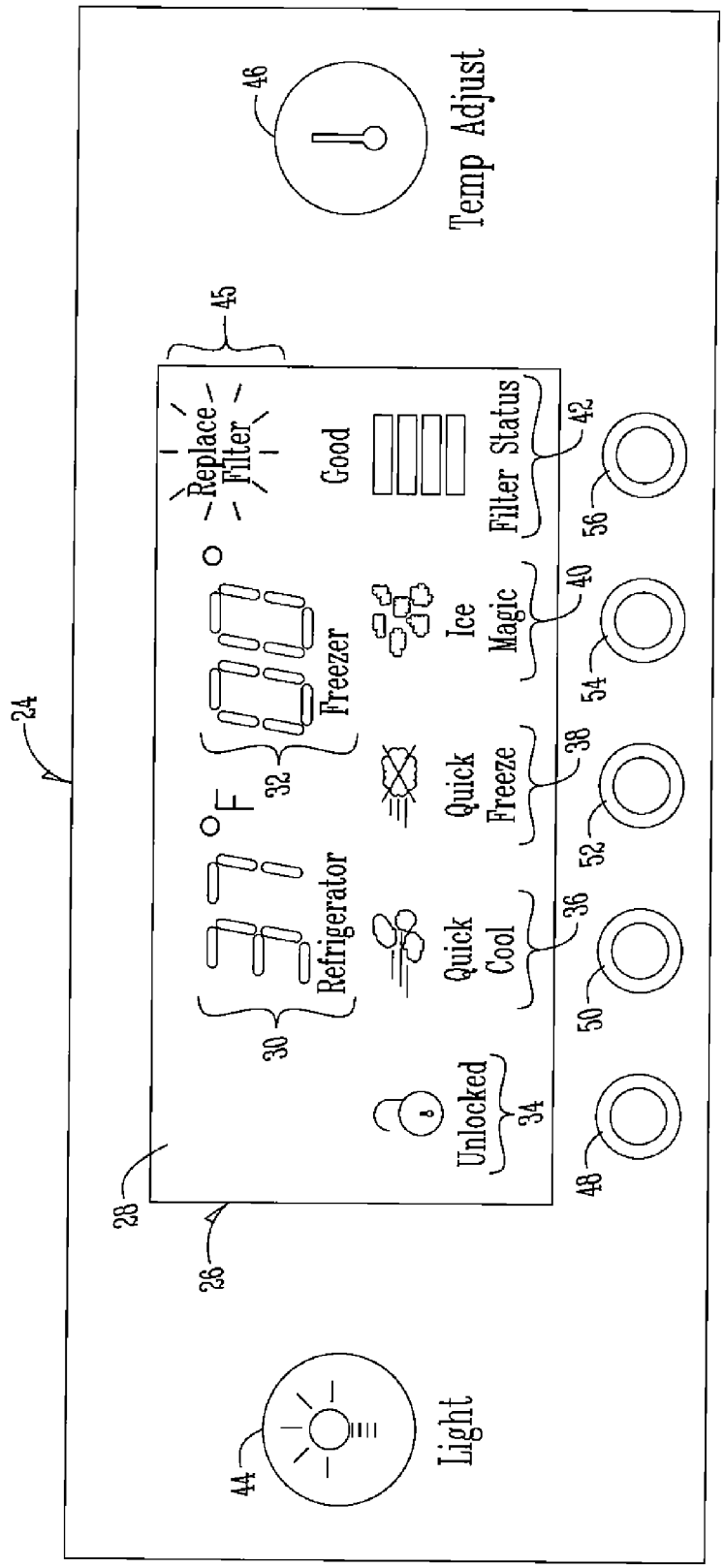
FIG. 2B is display of a user interface associated with a refrigerator according to one embodiment of the present invention with a replace filter icon flashing.

FIGS. 2A and 2B illustrate the user interface 24 in more detail. The user interface 24 includes a display 26. The display 26 may be a liquid crystal display (LCD) and may be touch sensitive so as to provide a means for user input. A default screen 28 is displayed on the display 26. The default screen 28 includes a refrigerator temperature 30, a freezer temperature 32. Other information shown includes the lock status 34 of the refrigerator 10, the quick cool status 36, the quick freeze status 38, the ICEMAGIC status 40, and the filter status 42. The lock status 34 is indicative of whether the ice dispenser is locked or unlocked. The quick cool status 36 indicates whether the quick cool feature is in use to speed the cooling of large amounts of groceries by temporarily lowering temperatures. The quick freeze status 38 indicates whether the quick freeze feature is in use to speed the cooling of items located in at least a portion of the freezer compartment. The ICEMAGIC status 40 indicates whether the ICEMAGIC system is in use. The ICEMAGIC system is a system for use when heavy ice usage is needed. ICEMAGIC is trademark of Whirlpool. The filter status 42 indicates the condition of a water filter. A bar graph type display is shown for indicating the filter status 42 so that a user can watch the water filter status change over time. Beneath the display 26 are buttons 48, 50, 52, 54, and 56. Each of these buttons is aligned with a corresponding indicator. Instead of buttons 48, 50, 52, 54, and 56 positioned below the display, a touch sensitive display may be used. The display 26 is preferably a touch sensitive display. A light button 44 is shown as well as a temperature adjust button 46. In FIG. 2A a call service icon 43 is flashing to indicate that there is a condition present which requires service. In FIG. 2B, a replace filter icon 45 is flashing to indicate that the filter needs replaced. Of course, numerous variations in the user interface are contemplated depending upon the type of appliance, the features, of the appliance, and other variations as may be appropriate in particular applications or environments.

Figure 3:
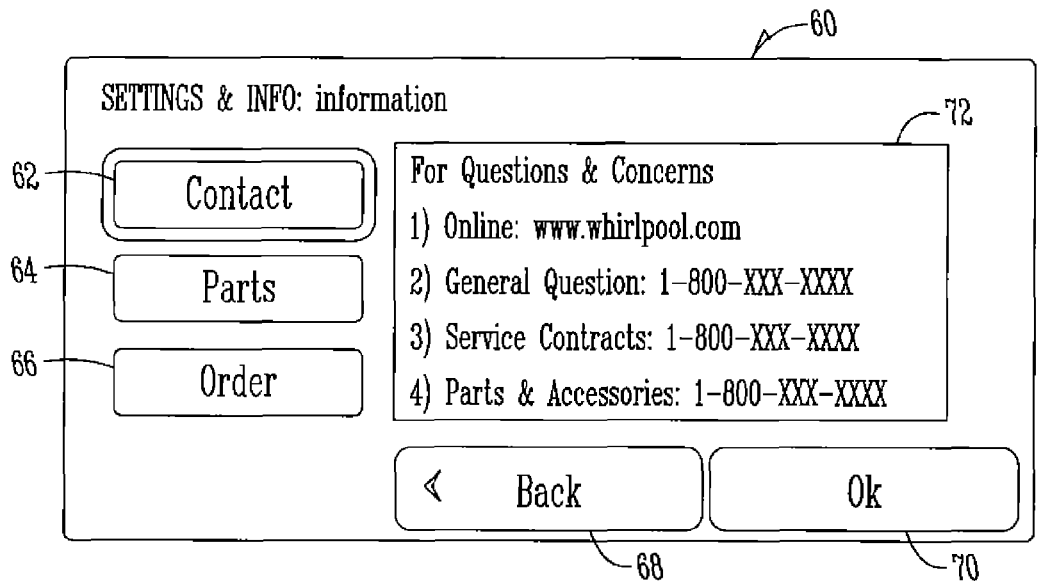
FIG. 3 is a display of a user interface associated with a refrigerator associated with providing contact information for accessing a web site, calling about general questions, calling about service contracts, and calling about parts and accessories.

FIG. 3 illustrates a screen display 60 for displaying settings and information. The screen display 60 includes a contact input 62 which may be activated to signal that contact information should be displayed. The screen display 60 includes a parts input 64 which may be activated to signal that parts information should be displayed. The screen display 60 includes an order input 66 which may be activated to signal that ordering information should be displayed. As shown in FIG. 3, the contact input 62, the parts input 62, and the order input 66 are inputs associated with the touch sensitive display 26. The inputs may be areas or regions of the screen display 60 which is displayed on the display 26. Alternatively, other forms of input may be used. The screen display 60 also includes contact information region 72 which as shown indicates a web site address, a toll-free number for general questions, a toll-free number for service contracts, and a toll-free number for parts and accessories. Also, a back input 68 and an "OK" input 70 are provided as a part of the user interface so that a user may indicate they wish to return to a previous screen by using the back input 68 or indicate that they are finished for now by using the "OK" input 70. The back input 68 and the "OK" input 70 may also be touch sensitive inputs.

Figure 4:
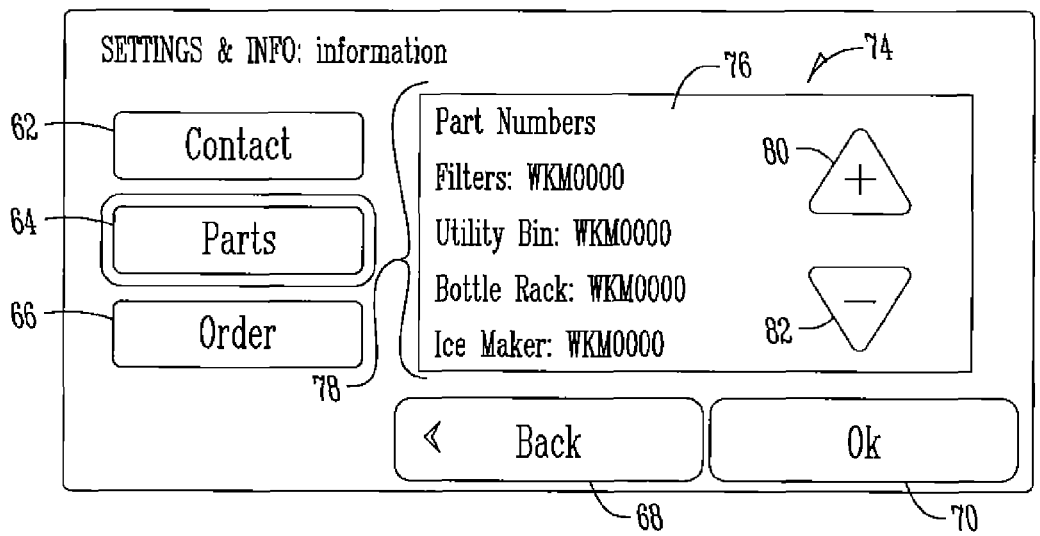
FIG. 4 is a display of a user interface associated with a refrigerator for displaying part number information about component parts of the refrigerator.

FIG. 4 illustrates a screen display 74 for displaying additional information about parts. The screen display 74 may be displayed after a user selects the parts input 62. The screen display 74 includes a parts number region 76 which includes proper and complete part numbers for various replacement parts and accessory parts which a user may require or desire. Examples of replacement parts include water filters, extra bins, shelves, or other parts. Thus, when a user needs information about replacement parts or accessory parts, the user need only access the information from the user interface of the refrigerator without attempting to find manuals and other information that may be lost, misplaced, or difficult to access.

In addition, the part information is complete so that a user can correctly order appropriate parts or accessories, without attempting to guess at the part numbers or order based on refrigerator model.

FIG. 4 includes a forward input 80 and a backward input 82 so that the user can scroll through the numbers of many different types of parts and accessories. The list of parts and accessories may be placed in various orders including by placing the most commonly order parts, such as water filters, at the top of the list. Alternatively, the list may be ordered alphabetically, by part number, or otherwise.

Figure 5:
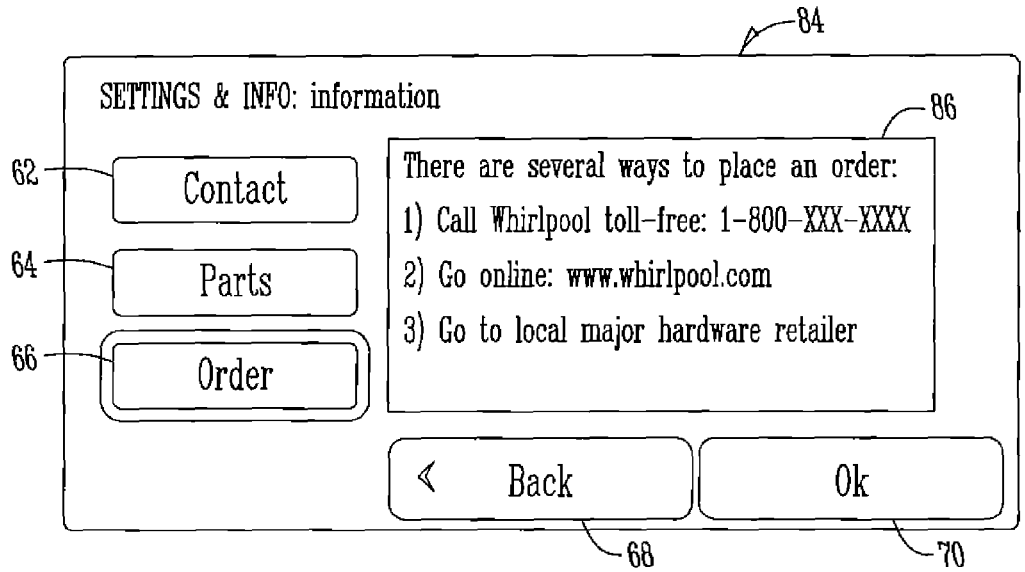
FIG. 5 is a display of a user interface associated with a refrigerator for displaying ordering information for replacement parts.

FIG. 5 illustrates a screen display 84 which includes ordering information 86. Screen display 84 may be displayed after a user selects the order input 66. The ordering information may include a phone number to call to place an order, a web site address to visit to place an order, or to indicate that replacement parts are available at retailers, resellers, or elsewhere. Where a phone number is used, preferably the phone number is a toll-free number. The display of ordering information by the refrigerator further provides convenience to a user as a user need not search for contact information or other ordering information.

Figure 6:
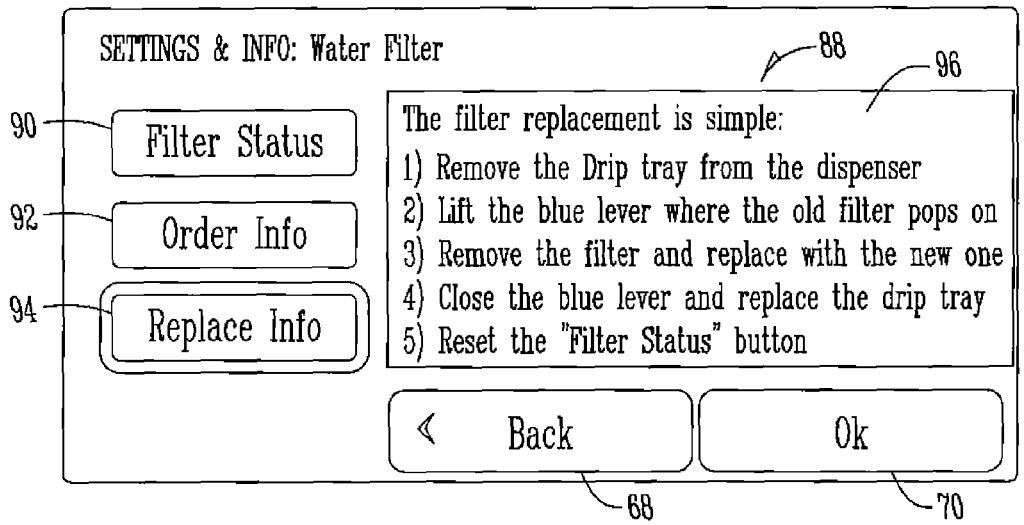
FIG. 6 is a display of a user interface associated with a refrigerator for displaying replacement information for a water filter.

FIG. 6 illustrates a water filter screen display 88 for providing information about the replacement of a water filter. A filter status input 90 is provided as well as a water filter order information input 92, and a water filter replacement information input 94. A user selects the water filter replacement information input 94 to view the screen display 88 which includes the water filter replacement information 96. The water filter replacement information 96 provides a user with the information necessary to replace the water filter, including how to remove the filter. Because this information is conveniently accessible by a user, the user need not attempt to find and reference instruction manuals and guides. Although instructions manuals and guides may generally be provided with appliances, users may lose or misplace this information. By making this information available from the user interface of the refrigerator, the user is able to easily and conveniently access this information when needed.

Figure 7:
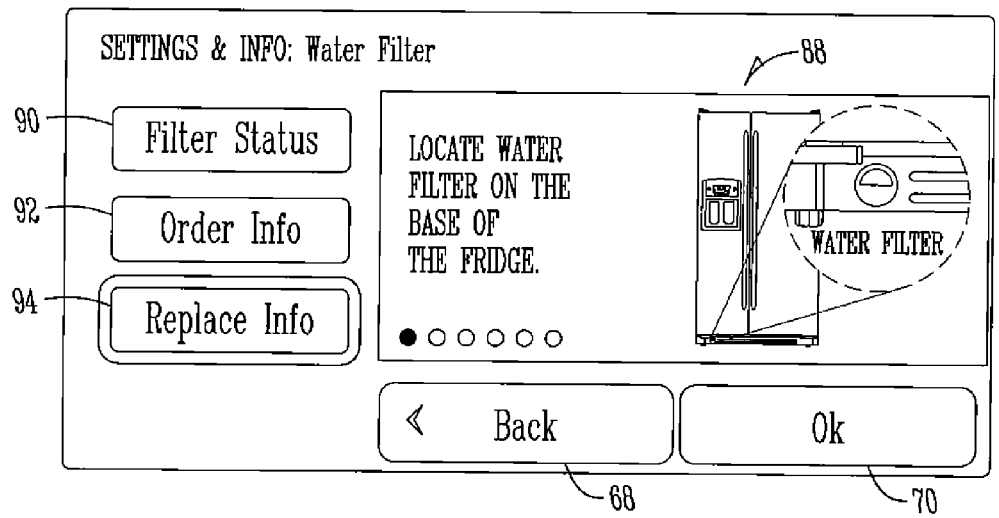
FIG. 7 is a display of a user interface associated with a refrigerator for displaying a portion of a picture sequence with instructions for replacing a water filter.
Figure 8:
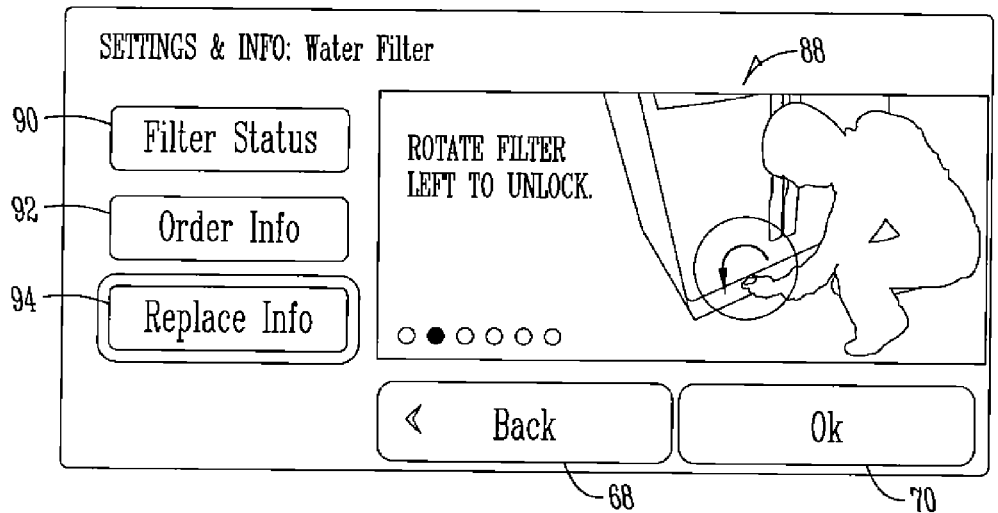
FIG. 8 is a display of a user interface associated with a refrigerator for displaying another portion of a picture sequence with instructions for replacing a water filter.

The instructions for a particular service or maintenance task can be conveyed to the user in a variety of different ways. For example, the instructions for replacing a water filter illustrated on the display 88 in FIG. 6 are in text. The instructions can also take other forms, such as still photos or images, a sequence of photos or images, video materials, or a combination of such items. Audio from a speaker 105 on the user interface 24 may also accompany what is shown on the display 88 to provide further explanation and instruction. FIGS. 7 and 8 are exemplary only and show two different still images with pictures and text on display 88 from a sequence of images used to teach the user how to install a water filter. The same could be done for other service or maintenance tasks. Preferably, audio instructions would also be provided from the speaker 105.

As an alternative to displaying the information on the user interface 24, the instructional materials may also be sent in electronic form via a wireless network to the user's cell phone, computer or other consumer electronics device.

Figure 9:
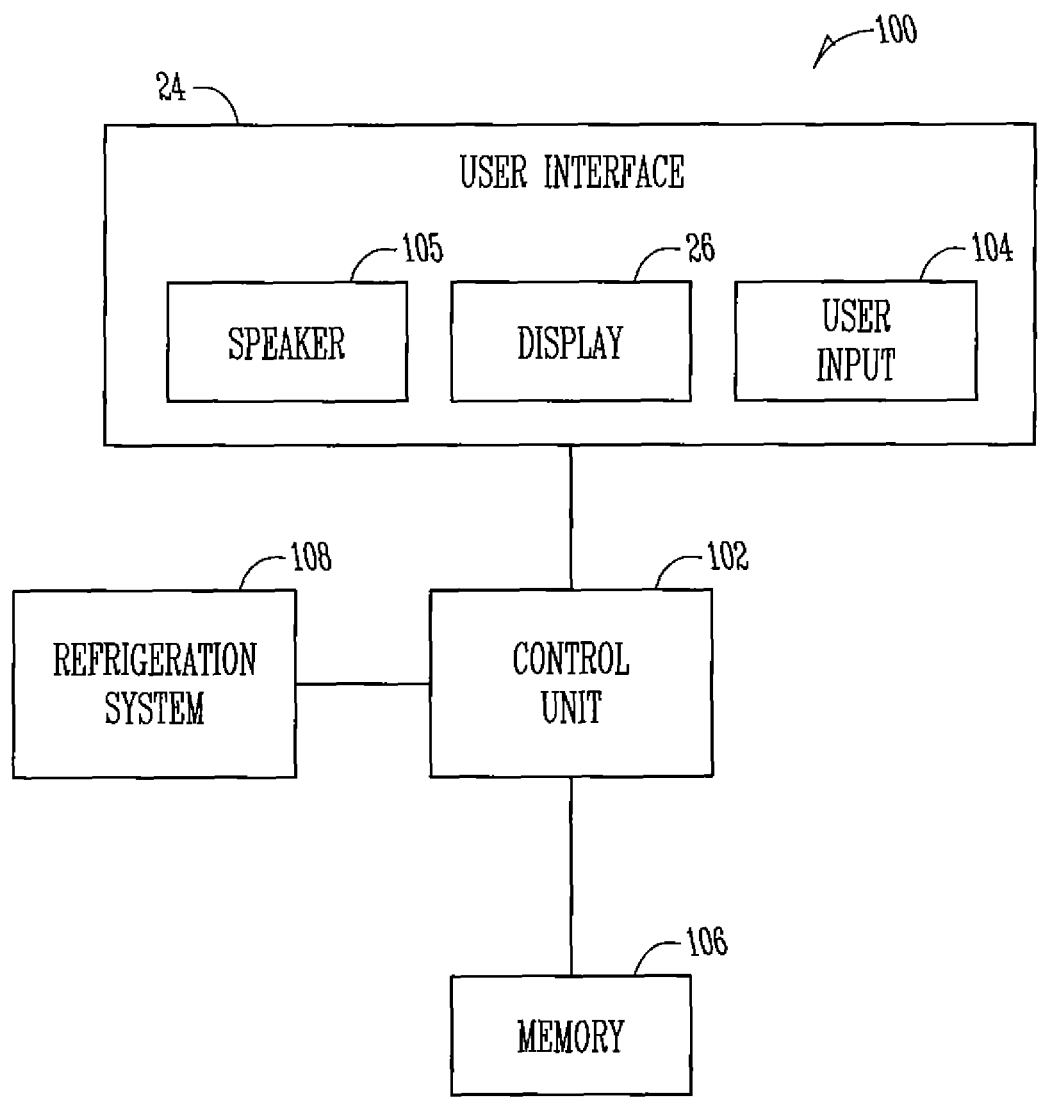
FIG. 9 is a block diagram according to one embodiment of the present invention.

FIG. 9 is a block diagram of one embodiment of a system associated with a refrigerator appliance. The system 100 includes a control unit 102 operatively connected to the user interface 24, which includes a speaker 105, a display 26 and one or more user inputs 104. A memory is also operatively connected to the control unit 102. The memory 106 may be used to store the screen displays or information presented on the screen displays including part information, contact or ordering information, and installation instructions. As previously discussed, the installation instructions can take a variety of forms, including text, still images and video. Audio information from speaker 105 may also accompany the installation instructions on the display 26. The control unit 102 may also be operatively connected to one or more sensors which are associated with the refrigerator system 108. The control unit may include one or more processors, microcontrollers, integrated circuits, or other intelligent controls. The control unit 102 communicates with the user input 104 and the display 26 to display appropriate information on the display 26, including the various screen displays illustrated in FIGS. 2A-2B and 3-8. Information regarding the screen displays may be stored in the memory 106. It is to be understood that the user input 104, the display 24, the memory 106, and the control unit 102 may be integrated in whole or in part. The user input 104 may include touch sensitive inputs associated with the display 26 as well as additional such as, but not limited to buttons.

In operation the user interface 24 of the refrigerator 10 interacts with a user to report on the state of the refrigerator, including various refrigerator functions or refrigerator features. This includes alerting the user of a condition requiring service or maintenance such as a water filter needing replacement or other condition. To assist the user in servicing or maintaining the refrigerator, the user interface 24 makes additional information available to the user such as part number information, contact information, and instructions for removing or replacing parts. Thus, the user has ready access to information needed from the refrigerator itself without needing to consult additional materials.

In operation, various methods may be used for providing convenience to a user of a refrigerator such that the user may service the refrigerator without consulting written documentation. The user interface provides relevant information so written documentation does not need to be relied upon. This can include information about a component part such as a replacement part or information about an accessory part. A water filter is an example of a replacement part. A bottle rack is an example of an accessory part.

An additional benefit of the present invention is that the contact information for obtaining replacement or accessory parts will always be readily available to the user of the refrigerator. When this contact information is used, the replacement or accessory parts is then obtained from an approved source. Thus, the manufacturer of the refrigerator can increase the likelihood that proper replacement parts or accessory parts are used and, if the manufacturer so chooses, that the manufacturer is contacted when replacement parts are needed. Thus, in operation, methods of the present invention may include the step of receiving an order for the component part from the user.

Although a preferred embodiment has been described in the context of a refrigerator, it is to be understood that aspects of the invention may be used in other types of appliances. In addition, the present invention contemplates numerous variations including variations in the structure and configuration of the appliance, the manner in which information is presented to the user, variations in the user interface including the type of user inputs provided, and other variations. The present invention is applicable to any type of repair, maintenance or service to an appliance performed by the user. The present invention is not to be unduly limited to the specific embodiments described herein as various modifications, options and alternatives fall within the spirit and the scope of the invention.

What is claimed is:

1. A refrigerator, comprising:
a refrigerator cabinet;
a fresh food compartment disposed within the refrigerator cabinet;
a freezer compartment disposed within the refrigerator cabinet;
a display operatively connected to the cabinet;
a control unit electrically connected to the display;
the control unit adapted for determining status of a part and presence of a condition requiring a replacement part for the part;
the control unit adapted for displaying on a default screen of the display temperature information for the fresh food compartment, temperature information for the freezer compartment, and a visual indicator indicative of the status of the part and the presence of the condition requiring the replacement part;
the control unit adapted for receiving from the user while the default screen is displayed on the display, an input requesting additional information about the condition requiring the replacement part;
the control unit adapted for displaying additional information about the condition requiring the replacement part on a settings and information screen on the display after receiving the input requesting additional information from the user;
the control unit adapted for receiving from the user while the settings and information screen is displayed on the display an input requesting parts information and an input requesting contact information for ordering the replacement part;
the control unit adapted for displaying a list of replacement parts and accessories after receiving the input requesting the parts information; and
the control unit adapted to switch between the default screen and the settings and information screen.

2. The refrigerator of claim 1 wherein the visual indicator indicative of the status of the part and the presence of the condition requiring the replacement part is a bar graph type display.

3. The refrigerator of claim 1 herein the contact information includes a phone number.

4. The refrigerator of claim 1 wherein the additional information about the condition includes a part number fix a replacement part.

5. The refrigerator of claim 4 wherein the replacement part is a filter.

6. The refrigerator of claim 5 wherein the filter is a water filter.

7. The refrigerator of claim 1 wherein the additional information about the condition includes instructions for servicing the refrigerator.

8. The refrigerator of claim 7 wherein the instructions for servicing the refrigerator include instructions for installing the replacement part.

9. The refrigerator of claim 1 wherein the visual indicator indicative of the presence of the condition requiring the replacement part blinks.

10. The refrigerator of claim 1, wherein the list of replacement parts and accessories are displayed by most commonly ordered replacement parts and accessories.

11. The refrigerator of claim 10, wherein the control unit is adapted for indicating where replacement parts and accessories are available at retailers and/or resellers.

12. A household appliance, comprising:
a household appliance housing;
a user interface operatively connected to the housing;
wherein the user interface comprises a display and user inputs;
wherein the user interface is adapted for showing on the display a part number for a component part, contact information for use in acquiring the component part, instructions for installing the component part, and provides a default screen on the display showing temperature information for the household appliance and an indicator of status of the component part and presence of a condition requiring the replacement part;
the user interface is adapted for receiving from the user while the default screen is displayed on the display, an input requesting additional information about the condition requiring the replacement part and displaying the additional information on a settings and information screen;
the user interface adapted for receiving from the user while a settings and information screen is displayed on the display an input requesting parts information and displaying on the display a list of replacement parts and accessories; and
the user interface adapted for receiving from the user while a water filter information screen is displayed on the display an input requesting status of a water filter.

13. The appliance of claim 12 wherein the contact information includes a phone number.

14. The appliance of claim 12 wherein the contact information includes a web site address.

15. The appliance of claim 12 wherein the component part is a replacement part.

16. The appliance of claim 12 wherein the status of the component part is displayed as a bar graph.

17. The appliance of claim 12 wherein the component part is an accessory part.

18. The appliance of claim 12 wherein the household appliance is a refrigerator and the household appliance housing is a refrigerator cabinet.

19. The household appliance of claim 12, wherein the list of replacement parts and accessories are displayed by most commonly ordered replacement parts and accessories.

20. The household appliance of claim 19, wherein the user interface is adapted for indicating where replacement parts and accessories are available at retailers and/or resellers.

21. A method for providing convenience to a user of a refrigerator, the method comprising:
providing the refrigerator wherein the refrigerator comprises:
(a) a refrigerator cabinet;
(b) a fresh food compartment disposed within the refrigerator cabinet;
(c) a freezer compartment disposed within the refrigerator cabinet;
(d) a display operatively connected to the cabinet;
(e) a control unit electrically connected to the display;
(f) the control unit adapted for determining status of a part and presence of a condition requiring a replacement part for the part;
(g) the control unit adapted for displaying on a default screen of the display temperature information for the fresh food compartment, temperature information for the freezer compartment, and a visual indicator indicative of the status of the part and the presence of the condition requiring the replacement part;

(h) the control unit adapted for receiving from the user while the default screen is displayed on the display, an input requesting additional information about the condition requiring the replacement part;

(i) the control unit adapted for displaying additional information about the condition requiring the replacement part on a settings and information screen on the display after receiving the input requesting additional information from the user; and (j) the control unit adapted for receiving from the user while settings and information screen is displayed on the display an input requesting parts information;

(k) the control unit adapted for displaying a list of replacement parts and accessories after receiving the input requesting the parts information;

displaying on the display of the refrigerator the default screen display showing temperature information for the refrigerator and the visual indicator indicative of the status of the part and the presence of the condition requiring the replacement part for the part;

receiving from the user while an alert is displayed on the default screen display, the input requesting additional information about the condition requiring the replacement part.

in response to the input providing on the display additional information including a menu for selecting between a first screen display, a second screen display, and a third screen display;

displaying on the display of the refrigerator the first screen display, the first screen display showing a part number for a component part;

displaying on the display of the refrigerator the second screen display, the second screen display showing contact information for use in acquiring the component part;

receiving an order for the component part from the user; and displaying on the display of the refrigerator the third screen display, the third screen display showing instructions for replacing the component part.

22. The method of claim 21 wherein the component part is a replacement part.

23. The method of claim 22 wherein the replacement part is a water filter.

24. The method of claim 21 wherein the component part is an accessory part.

25. The method of claim 21 wherein the contact information includes a phone number.

26. The method of claim 21 wherein the contact information includes a web site address.

27. The method of claim 21 wherein the display is a touch sensitive display.

28. The method of claim 21, further comprising sending the instructions for replacing the component part in electronic form via, a wireless network to a cell phone.

29. A refrigerator, comprising:

a refrigerator cabinet;

a fresh food compartment disposed within the refrigerator cabinet;

a freezer compartment disposed within the refrigerator cabinet;

a display operatively connected to the refrigerator cabinet;

at least one user input associated with the display;

a memory storing screen display information including part numbers for a plurality of refrigerator component parts, contact information for use in acquiring the plurality of refrigerator component parts, and instructions for installing the refrigerator component parts in the refrigerator;

wherein the display is adapted for showing on the display a default screen display showing an indicator of status of a component part and presence of a condition requiring a replacement part for the component part, an indicator of status of a water filter during normal operation, and temperature information for the refrigerator, a first screen display comprising at least one of the part numbers, a second screen display comprising the contact information, and a third screen display comprising the instructions;

wherein the at least one user input provides for receiving user input for requesting additional information about the condition requiring the replacement part while the default screen display is displayed;

wherein the at least one user input further provides for receiving further user input for switching between any one of the first screen display, the second screen display, and the third screen display; and wherein the at least one user input further provides for receiving a user input for ordering the component part.

30. The system of claim 29 wherein the component parts include replacement parts for the refrigerator.

31. The system of claim 29 wherein the component parts include accessory parts for the refrigerator.

* * * * *